United States Patent [19]

Faini

[11] Patent Number: 4,727,227

[45] Date of Patent: Feb. 23, 1988

[54] MEASURING INSTRUMENT CAM-ACTUATED MICROSWITCH UNIT

[76] Inventor: Osvaldo Faini, Via Arno, 23, 20020 Cassina Nuova Di Bollate (Milano), Italy

[21] Appl. No.: 947,842

[22] Filed: Dec. 30, 1986

[30] Foreign Application Priority Data

May 9, 1986 [IT] Italy ............................... 20375 A/86

[51] Int. Cl.⁴ ......................... G01D 13/26; H01H 3/32

[52] U.S. Cl. ................................ 200/56 R; 200/153 T

[58] Field of Search .............. 200/56 R, 56 A, 153 G, 200/153 H, 153 T, 153 L, 153 LB

[56] References Cited

U.S. PATENT DOCUMENTS 3,090,397 5/1963 Spencer ........................ 200/56 R X 3,451,026 6/1969 Siri et al. ...................... 200/56 A X 3,678,758 7/1972 Lawrence ..................... 200/56 R X 3,914,770 10/1975 Reis ............................. 200/56 R X

*Primary Examiner*—J. R. Scott

*Attorney, Agent, or Firm*—Budknam and Archer

[57] ABSTRACT

A cam-actuated microswitch unit has cams the positions of which can be varied relative to a drive shaft to vary the switch-actuating point. The unit includes a plurality of microswitches rigidly connected to a support while the cams are frictionally retained in a selected angular orientation on the drive shaft which can be connected to a measuring instrument so that its angular orientation is representative of the magnitude of a physical quantity to which the instrument is sensitive. The cams are connected to index pointers which can be moved over a movable scale fixed for rotation with the drive shaft to determine and to display the switch point settings.

5 Claims, 5 Drawing Figures

MEASURING INSTRUMENT CAM-ACTUATED MICROSWITCH UNIT

BACKGROUND OF THE INVENTION

Microswitch-actuated control units are currently based on the concept of mounting the or each cam fixedly on a rotatable shaft to actuate a microswitch the position of which is adjustable to vary the switch point. The rotatable shaft has an associated quadrant with a graduated scale marked thereon, against which the actuation position of the microswitches may be read.

This type of construction, with adjustable microswitches, involves a very bulky structure the complexity of which becomes even greater with an increase in the number of microswitches utilised, and it will be appreciated that each microswitch can operate on only a single parameter so apparatus having several microswitches is very often required. However, with the structures of the known type there are considerable limitations in relation to the number of microswitches which can be used, in that the known structures involve an excessive complexity and bulk if more than a very limited number of microswitches are employed.

OBJECTS OF THE INVENTION

A primary object of the present invention is that of providing a new type of microswitch unit capable of being used in a wide range of different applications and, in practice, reversing conventional principles of construction, with the advantage of having an extremely compact and functional assembly.

Another object of this invention is that of providing a cam-actuated microswitch unit in which all the operations relating to the selection of the values at which the microswitches are operated can be effected in an extremely rapid and simplified manner.

A further object of the present invention is that of providing a microswitch unit which can exercise multiple switching functions on external electrical circuits connected to the microswitches themselves by cables or conductors, by suitably positioning individual control indices in selected positions on a graduated scale of an indicator.

Yet another object of the invention is to provide a switch unit which is easily obtainable starting from elements and materials which are commonly available on the market, and which is therefore very advantageous from an economic point of view.

Another object of the present invention is to provide a microswitch unit which, by its peculiar constructional characteristics, is able to offer the widest guarantees of reliability and safety in use.

SUMMARY OF THE INVENTION

According to the present invention, there is provided a cam-actuated microswitch unit in which the point at which the or each microswitch is actuated is adjustable, characterised in that it comprises at least one microswitch fixedly connected to a supporting frame for actuation by the or a respective cam carried on a drive shaft connectable to a measuring instrument or detector apparatus so that the angular position of the drive shaft is related to a physical quantity detected by the said instrument or apparatus, in that the relative angular orientation of the or each cam on the drive shaft is selectively adjustable to determine the point at which the or an associated said microswitch is actuated, in that the selected relative angular position of the or each cam and the drive shaft is retained by friction, and in that the relative angular orientation of the or each cam with respect to the drive shaft is indicated by an index pointer movable with respect to a movable graduated scale carried fixedly on the drive shaft for rotation therewith.

The opening or closing of the switches in respective electrical circuits may serve any appropriate purpose, for example it may serve to regulate and/or control the function of any type of machine, or to monitor or complete any process. Of course, for such operation, the microswitch unit must be mounted on appropriate detector apparatus or on a measuring instrument.

It is appropriate to emphasise that the present microswitch unit allows the operation of any type of machine or installation to be regulated and/or controlled by operating on any determined parameter, which may be, for example, pressure, temperature, vacuum, time or any other measurable physical quantity, and switching may be selected to occur if the measured quantity exceeds a selected value or if it falls below a selected value.

Various other features and advantages of the present invention will become apparent from a study of the following descriptions of a preferred embodiment, in which reference is made to the accompanying drawings, provided purely by way of non-limitative example.

DESCRIPTION OF THE PREFERRED EMBODIMENT

Figure 1:
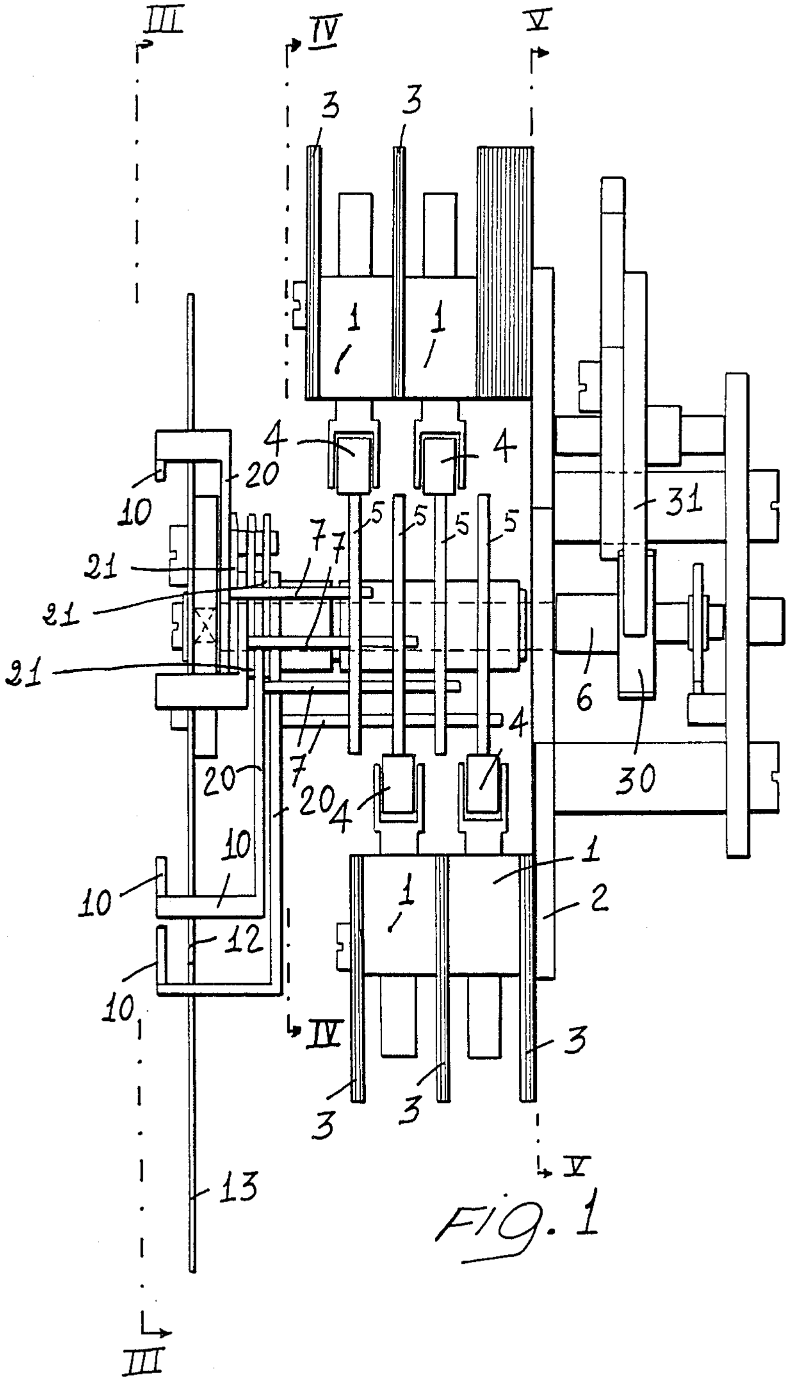
FIG. 1 is a side view of a microswitch unit formed as an embodiment of the invention.
Figure 2:
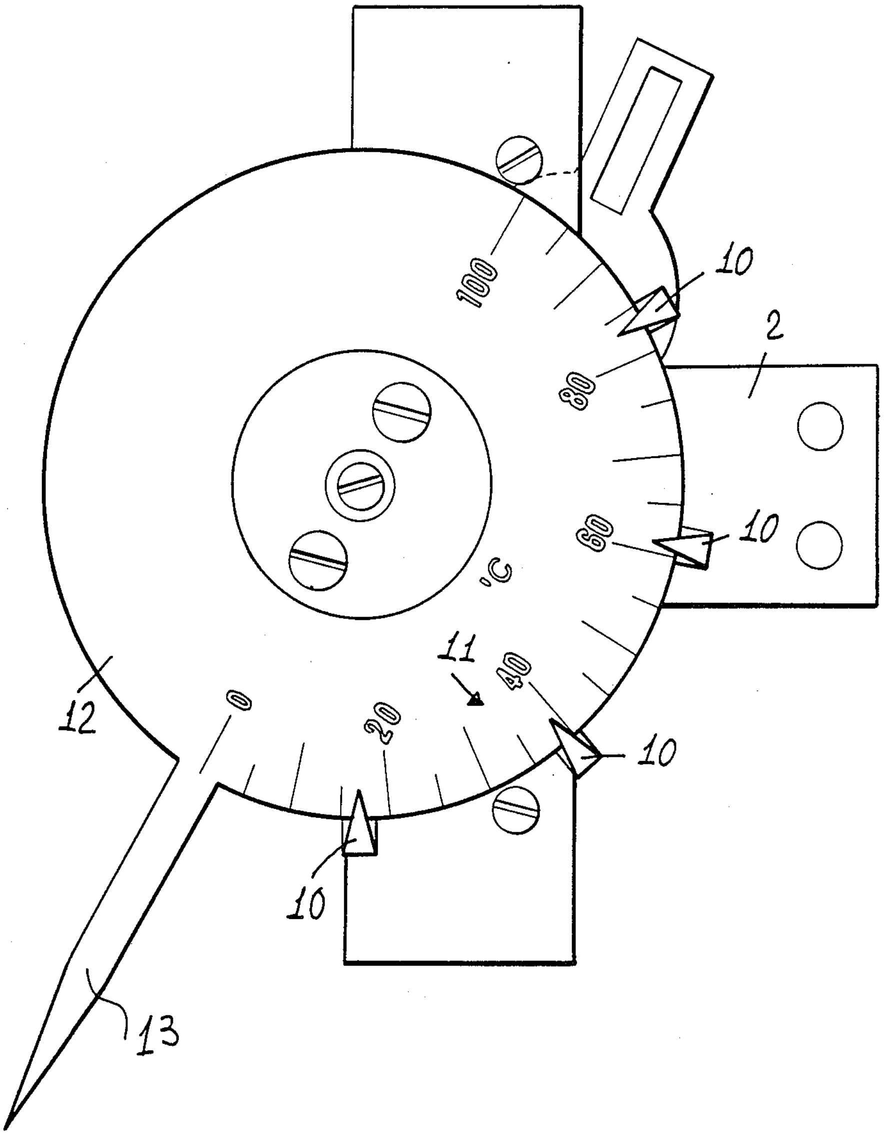
FIG. 2 is a frontal view of the microswitch unit of FIG. 1.
Figure 3:
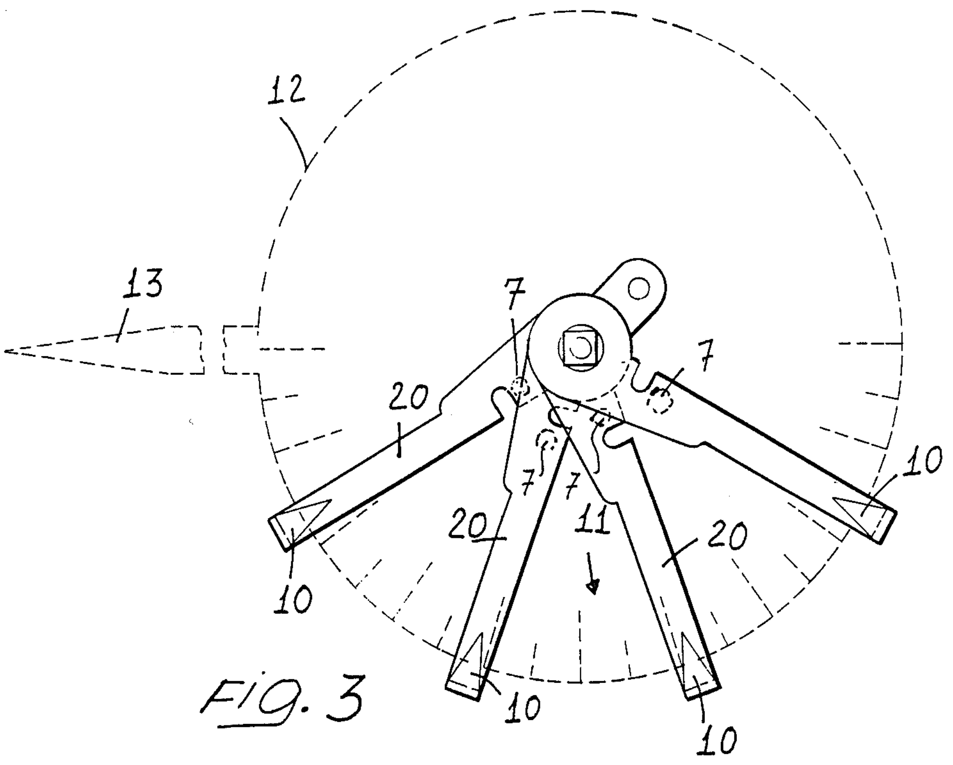
FIG. 3 is a schematic view of the index markers linked to the movable graduated pointer scale shown in broken outline.

Referring now to the drawings, the cam-actuated microswitch unit of the invention comprises a plurality of microswitches 1 which are fixedly connected to a supporting framework, generally indicated with the reference numeral 2. Unlike the prior art arrangements the positions of the microswitches 1 are not variable to set the switching positions. In the illustrated example there are four microswitches positioned in diametrically opposite pairs.

In more detail, the microswitches 1 are isolated from one another by means of insulating plates 3 and are each provided with a cam follower roller 4 which can be engaged by a respective cam 5. All the cams 5 are carried, with the possibility of adjusting their angular orientation on a rotatable drive shaft 6 which is associated with and driven by a detector apparatus or a measuring instrument (not illustrated in the drawings) by means of which the value of the physical quantity in relation to which the microswitches are intended to be actuated can be displayed by means of a shaft driven pointer 13 fixed to the end of the shaft 6. The pointer 13 is formed integrally with a disc 12 marked with a graduated scale which will hereinafter be referred to as the moving pointer scale. The pointer 13 itself sweeps over a fixed graduated scale defined as the indicating fixed dial of said detector apparatus, (not shown) to indicate the instantaneous values of the physical quantity under determination, which will depend, of course, on the nature of the measuring instrument or detector apparatus to which the microswitch unit of the invention is fitted.

Obviously, the moving pointer scale and the fixed graduated scale must be related to one another and cover the same range.

The cams 5 are mounted on the rotating shaft 6 and frictionally held in place to have the possibility of being turned with respect to the shaft 6 to vary their angular position, and therefore the angular position of the shaft 6 at which the associated microswitch is actuated. The friction means mounting the cams on their shaft 6 have not been specifically shown, since they are of conventional type, and for simplifying the drawings. Upon rotation of the shaft 6 the cams are carried around with it by virtue of the frictional resistance to operate the microswitches at points in the arc of rotation of the shaft 6 determined by the cam setting. This cam setting movement is achieved by overcoming the frictional resistance of the mentioned not shown friction means.

Figure 4:
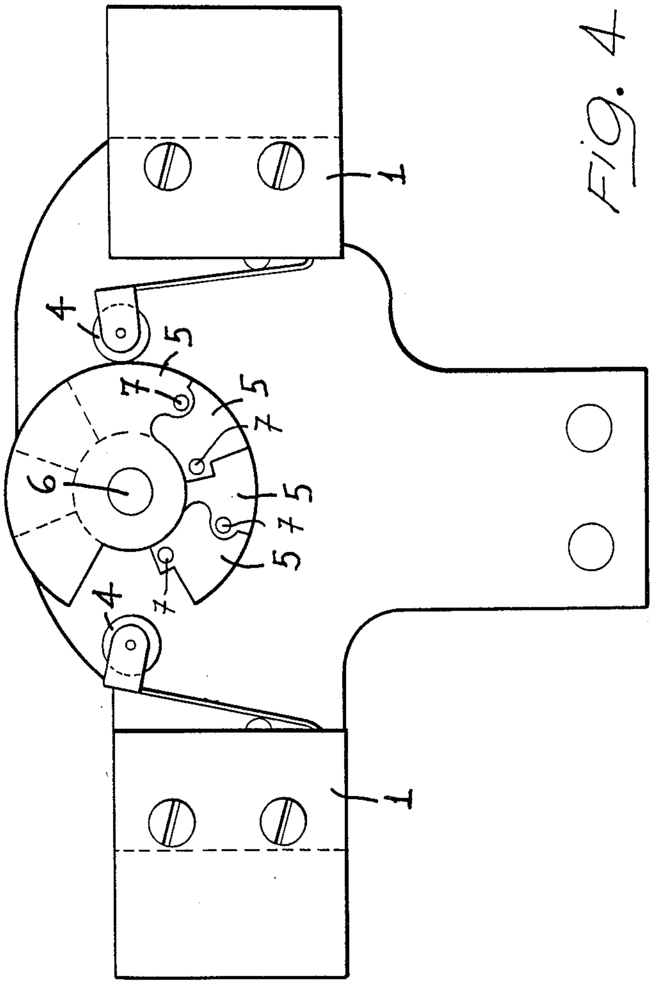
FIG. 4 is a sectional view taken on the line IV—IV of FIG. 1.

The cams 5, as is best seen in FIG. 4 which shows all four cams in different angular positions, are semicircular in shape and are associated, by means of axially extending pins 7, with positioning arms 20 which have index pointers 10 variously positionable with respect to the graduated pointer scale 11 on the pointer disc 12 which is rigidly connected to the drive shaft 6.

The arms 20 carrying the index pointers 10 are separated from one another by means of separators indicated 21.

The positioning of the cams 5 with respect to the drive shaft 6 is effected by means of the pins 7, which engage at one end in the respective cams whilst at the other end they are connected to the arms 20 which are frictionally mounted on the drive shaft 6. Also in this case the friction means mounting the arms 20 on the drive shaft 6 have not specifically shown since they are conventional and in order to simplify the drawings. By manually positioning the various index pointers 10 on the graduated pointer scale 11, through rotation of the corresponding arms 20, the angular position of the cams 5 and the point at which they act on the associated microswitch is determined.

Figure 5:
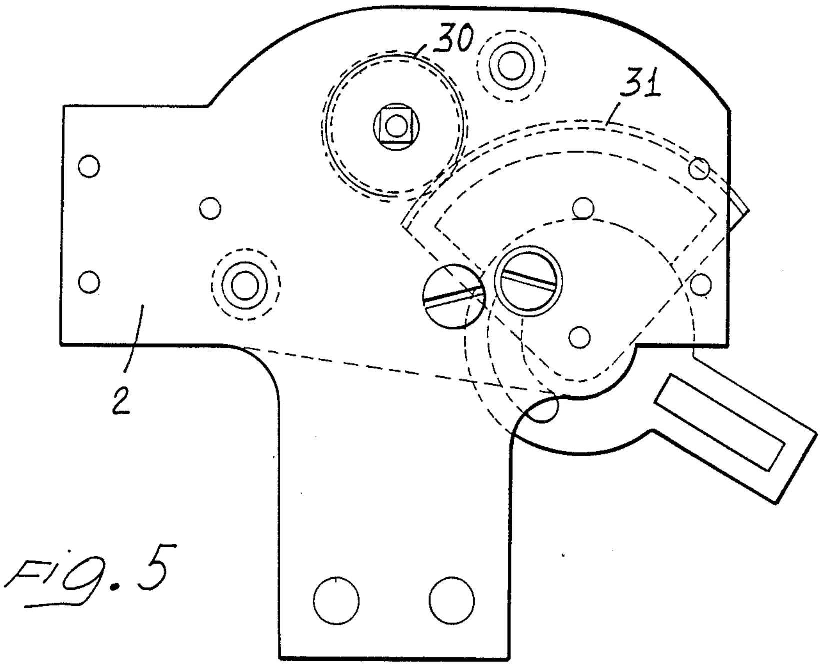
FIG. 5 is a sectional view taken on the line V—V of FIG. 1.

In the drawings there is illustrated a graduated scale the values of which increase with respect to a right handed rotation, that is to say clockwise: by suitably modifying the position of the microswitches and the cams it is possible, however, to obtain a left handed arrangement of the graduated scale. In the connection of the microswitch unit to the measuring instrument it is possible to have a step-up transmission ratio, or a step-down transmission ratio or an equal transmission ratio. For this purpose, as is better seen in FIG. 5, there is provided a drive gear 30 keyed onto the drive shaft 6 and meshing with a toothed sector 31 which is turned by the movement of the measuring instrument to transmit motion to the cams 5 via the shaft 6.

The number of microswitches 1 and the number of associated cams 5 can be varied as required simply by extending the unit axially or by adding more microswitches at different angular positions, the only limitation on the number of microswitches which can be used is the rotary couple available at the drive shaft: it is evident that this couple, necessary to overcome the friction as the curved surface of each cam moves with respect to the cam follower of the associated microswitch depends exclusively on the type of apparatus or measuring instrument for which the unit is intended.

From the above description it will be seen that the microswitch unit of the invention has very reduced dimensions and the setting of the microswitch actuation positions can be effected quickly and easily without creating difficulties either in construction or in use. Thus, by reversing conventional arrangements currently used in the production of microswitch units it is possible to obtain considerable advantages both from a structural point of view and from a functional point of view.

What is claimed is:

1. A cam-actuated microswitch unit comprising a support frame, at least one microswitch fixedly connected to said support frame, at least one cam provided for actuation of said microswitch, a drive shaft adjustably carrying, in an adjustable relative angular orientation, said at least one cam, a gear on said drive shaft to connect it to an associated gear of a measuring instrument sensitive to the value of a physical quantity such that the angular position of said drive shaft is related to the value of said physical quantity detected by said measuring instrument, index pointer means movable with respect to a movable graduated scale carried fixedly on said drive shaft and driven thereby for rotation therewith for indicating the relative angular orientation of said at least one cam with respect to said drive shaft.

2. A microswitch unit according to claim 1, wherein there are a plurality of microswitches fixedly mounted on said support frame in two groups aligned axially with one another and disposed in diametrically opposite positions across the axis of said drive shaft.

3. A microswitch according to claim 1, wherein said cams are rigidly connected to said index pointers by means of connector pins extending substantially parallel to said drive shaft.

4. A microswitch unit according to claim 3, wherein said index pointers are connected to said connector pins of said cams by means of radially extending arms supported by said drive shaft.

5. A microswitch unit according to claim 1, wherein said movable graduated scale is formed on a disc, said disc having a pointer rigid therewith for indicating the value of said physical quantity represented by the angular position of said drive shaft, over a fixed graduated scale associated with said measuring instrument.

* * * * *